United States Patent
Samuel et al.

(10) Patent No.: US 11,409,541 B2
(45) Date of Patent: Aug. 9, 2022

(54) SYSTEMS AND METHODS FOR BINDING SECONDARY OPERATING SYSTEM TO PLATFORM BASIC INPUT/OUTPUT SYSTEM

(71) Applicant: Dell Products L.P., Round Rock, TX (US)

(72) Inventors: Balasingh P. Samuel, Round Rock, TX (US); Ibrahim Sayyed, Georgetown, TX (US); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 241 days.

(21) Appl. No.: 16/793,361

(22) Filed: Feb. 18, 2020

(65) Prior Publication Data

US 2021/0255873 A1 Aug. 19, 2021

(51) Int. Cl.
*G06F 9/4401* (2018.01)
*G06F 13/36* (2006.01)
*G06F 21/57* (2013.01)
*H04L 9/32* (2006.01)
*H04L 9/30* (2006.01)

(52) U.S. Cl.
CPC .............. *G06F 9/441* (2013.01); *G06F 13/36* (2013.01); *G06F 21/575* (2013.01); *H04L 9/3073* (2013.01); *H04L 9/3247* (2013.01)

(58) Field of Classification Search
CPC ........ G06F 9/441; G06F 13/16; G06F 21/575; G06F 21/64; H04L 9/3073; H04L 9/3247
See application file for complete search history.

(56) References Cited

U.S. PATENT DOCUMENTS

| | | | |
|---|---|---|---|
| 2003/0221115 A1* | 11/2003 | Itoh | G06F 21/57 713/189 |
| 2007/0106986 A1* | 5/2007 | Worley, Jr. | G06F 9/45537 718/1 |
| 2009/0150678 A1* | 6/2009 | Li | H04L 63/083 713/183 |
| 2016/0306961 A1* | 10/2016 | Suryanarayana | G06F 21/44 |
| 2017/0243009 A1* | 8/2017 | Sejpal | G06F 21/577 |
| 2018/0006815 A1* | 1/2018 | Young | H04L 9/0819 |

(Continued)

*Primary Examiner* — Raymond N Phan
(74) *Attorney, Agent, or Firm* — Jackson Walker L.L.P.

(57) ABSTRACT

An information handling system may include a processor, non-transitory computer readable media communicatively coupled to the processor and having stored thereon a primary operating system of the information handling system and a secondary operating system of the information handling system, and a basic input/output system communicatively coupled to the processor and having provisioned thereon a signed signature of the secondary operating system signed with a private key of a public-private key pair and a public key of the public-private key pair. The basic input/output system is configured to, responsive to a determination to boot to the secondary operating system in lieu of booting to the primary operating system of the information handling system verify the secondary operating system using the signed signature of the secondary operating system and the public key and responsive to verifying the secondary operating system, allow the information handling system to boot to the secondary operating system.

27 Claims, 3 Drawing Sheets

(56) References Cited

U.S. PATENT DOCUMENTS

2018/0032734 A1\* 2/2018 Gunti .................... G06F 21/575
2018/0365426 A1\* 12/2018 Callaghan ............. G06F 21/575
2020/0250293 A1\* 8/2020 Paulraj ................. G06F 9/4401

\* cited by examiner

SYSTEMS AND METHODS FOR BINDING SECONDARY OPERATING SYSTEM TO PLATFORM BASIC INPUT/OUTPUT SYSTEM

TECHNICAL FIELD

The present disclosure relates in general to information handling systems, and more specifically to binding a secondary operating system of an information handling system to a platform basic input/output system of the information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some instances, an information handling system may be configured to boot to a secondary operating system (e.g., a service operating system, recovery operating system, or rescue operating system) when it is unable to boot to a primary host operating system of the information handling system. The secondary operating system may either be installed in a hidden partition of an internal storage resource (e.g., hard drive) of the information handling system or in an external storage resource (e.g., a Universal Serial Bus drive) that may be coupled to the information handling system. Such secondary operation system may be configured to perform one or more repair/recovery tasks, including executing diagnostics, repairing a system registry, or reinstalling the primary operating system from a factory image or other source image.

The existence of the secondary operating system may expose an undesirable security vulnerability. For example, a malicious actor may tamper with the secondary operating system such that user data stored on the information handling system may be extracted using tampered code of the secondary operating system. Thus, while user data may be protected by the primary operating system (e.g., by using Windows privileges in the Microsoft Windows operating system), a malicious actor may add malicious code to the secondary operating system code that may serve as a backdoor interface to access user data. Thus, it may be desirable to detect for such malicious code before it executes.

SUMMARY

In accordance with the teachings of the present disclosure, the disadvantages and problems associated with security vulnerabilities of a secondary operating system may be reduced or eliminated.

In accordance with embodiments of the present disclosure, an information handling system may include a processor, non-transitory computer readable media communicatively coupled to the processor and having stored thereon a primary operating system of the information handling system and a secondary operating system of the information handling system, and a basic input/output system communicatively coupled to the processor and having provisioned thereon a signed signature of the secondary operating system signed with a private key of a public-private key pair and a public key of the public-private key pair. The basic input/output system is configured to, responsive to a determination to boot to the secondary operating system in lieu of booting to the primary operating system of the information handling system verify the secondary operating system using the signed signature of the secondary operating system and the public key and responsive to verifying the secondary operating system, allow the information handling system to boot to the secondary operating system.

In accordance with these and other embodiments of the present disclosure, a method may include, in an information handling system comprising non-transitory computer readable media having stored thereon a primary operating system of the information handling system and a secondary operating system of the information handling system and the information handling system further comprising a basic input/output system communicatively having provisioned thereon a signed signature of the secondary operating system signed with a private key of a public-private key pair and a public key of the public-private key pair: responsive to a determination by the basic input/output system to boot to the secondary operating system in lieu of booting to the primary operating system of the information handling system, verifying, with the basic input/output system, the secondary operating system using the signed signature of the secondary operating system and the public key, and responsive to verifying the secondary operating system, allowing, by the basic input/output system, the information handling system to boot to the secondary operating system.

In accordance with these and other embodiments of the present disclosure, an article of manufacture may include a computer readable medium and computer-executable instructions carried on the computer readable medium, the instructions readable by a processor, the instructions, when read and executed, for causing the processor to, in an information handling system comprising non-transitory computer readable media having stored thereon a primary operating system of the information handling system and a secondary operating system of the information handling system and the information handling system further comprising a basic input/output system communicatively having provisioned thereon a signed signature of the secondary operating system signed with a private key of a public-private key pair and a public key of the public-private key pair: responsive to a determination by the basic input/output system to boot to the secondary operating system in lieu of booting to the primary operating system of the information handling system, verify, with the basic input/output system, the secondary operating system using the signed signature of the secondary operating system and the public key, and responsive to verifying the secondary operating system, allow, by the basic input/output system, the information handling system to boot to the secondary operating system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
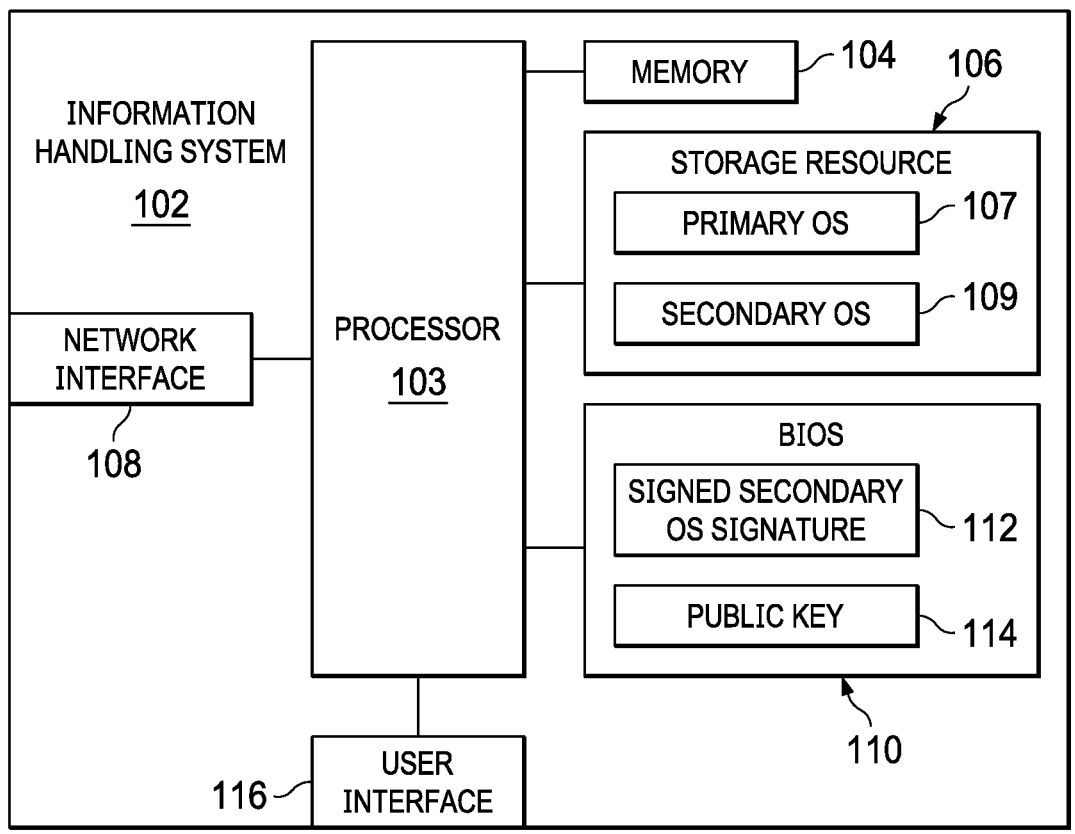
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may be a server. In other embodiments, information handling system 102 may be a personal computer (e.g., a desktop computer or a portable computer). As depicted in FIG. 1, information handling system 102 may include a processor 103, a memory 104 communicatively coupled to processor 103, a storage resource 106 communicatively coupled to processor 103, a network interface 108 communicatively coupled to processor 103, a basic input/output system (BIOS) 110 communicatively coupled to processor 103, and a user interface 116 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, BIOS 110, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage resource 106 may be communicatively coupled to processor 103 and may include any system, device, or apparatus configured to retain program instructions or data for a period of time (e.g., a computer-readable medium). In some embodiments, storage resource 106 may include a hard disk drive, a magnetic tape library, an optical disk drive, a magneto-optical disk drive, a compact disc drive, a solid state storage drive, a flash drive and/or any other suitable computer-readable medium. In some embodiments, storage resource 106 may reside internal to a chassis or other enclosure comprising information handling system 102 and not be readily accessible without opening such chassis or other enclosure. In other embodiments, storage resource 106 may reside internal to a chassis or other enclosure comprising information handling system 102. As shown in FIG. 1, storage resource 106 may have stored thereon a primary, or host, operating system (OS) 107 and a secondary OS 109.

Primary operating system 107 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by OS 107. Active portions of OS 107 may be transferred from storage resource 106 to memory 104 for execution by processor 103.

Secondary OS 109 may comprise any program of executable instructions, or aggregation of programs of executable instructions, configured as a special-purpose OS to perform diagnostics, recovery, and/or repair to primary OS 107 and/or other components of information handling system 102. In some embodiments, secondary OS 109 may be stored in a hidden partition of storage resource 106, and may be configured to boot in lieu of primary OS 107 if information handling system 102 is unable to boot to primary OS 107.

Network interface 108 may comprise any suitable system, apparatus, or device operable to serve as an interface between information handling system 102 and a network comprising one or more other information handling systems. Network interface 108 may enable information handling system 102 to communicate over such a network using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network interface 108 may interface with one or more networks implemented as, or as part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In certain embodiments, network interface 108 may comprise a network interface card, or "NIC."

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

As shown in FIG. 1, BIOS 110 may comprise signed secondary OS signature 112 and public key 114. As described in greater detail below, signed secondary OS signature 112 and public key 114 may be stored within BIOS 110 during provisioning of information handling system 102. Signed secondary OS signature 112 may comprise a hash or other unique signature of the image of secondary OS 109 signed with a private key of a public-private key pair. Public key 114 may be the public key of the public-private key pair that includes the private key used to sign signed secondary OS signature 112.

User interface 116 may comprise any instrumentality or aggregation of instrumentalities by which a user may interact with information handling system 102. For example, user interface 116 may permit a user to input data and/or instructions into information handling system 102 (e.g., via a keyboard, pointing device, and/or other suitable component), and/or otherwise manipulate information handling system 102 and its associated components. User interface 116 may also permit information handling system 102 to communicate data to a user, e.g., by way of a display device.

Figure 2:
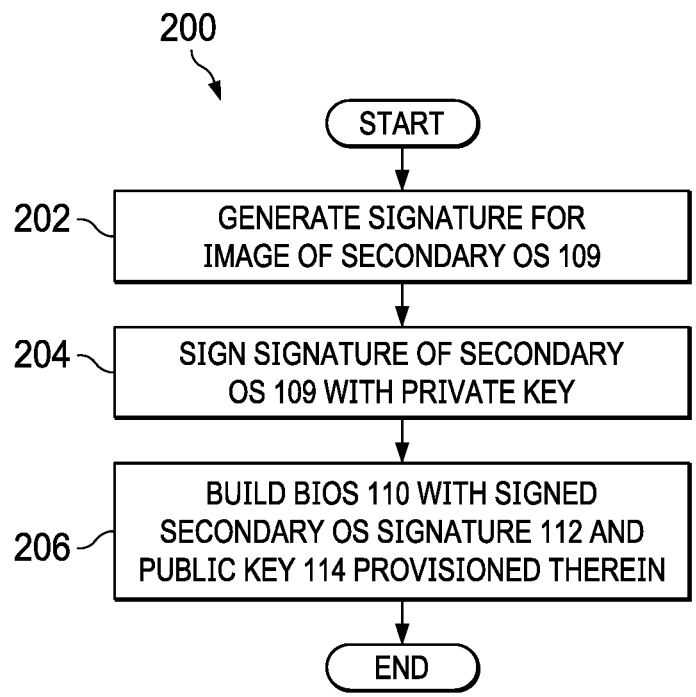
FIG. 2 illustrates a flow chart of an example method for provisioning an information handling system to bind a secondary operating system of the information handling system to a basic input/output system of the information handling system, in accordance with embodiments of the present disclosure.

FIG. 2 illustrates a flow chart of an example method 200 for provisioning information handling system 102 to bind secondary OS 109 to BIOS 110, in accordance with embodiments of the present disclosure. According to one embodiment, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, a provisioning process (e.g., a factory provisioning process) for information handling system 102 may generate a signature (e.g., a hash) for the image (e.g., Windows image file) for secondary OS 109. At step 204, the provisioning process may sign the signature with the private key of the public-private key pair that includes public key 114 in order to generate signed secondary OS signature 112. At step 206, the provisioning process may build BIOS 110 such that BIOS 110 includes signed secondary OS signature 112 and public key 114. After conclusion of step 206, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Figure 3:
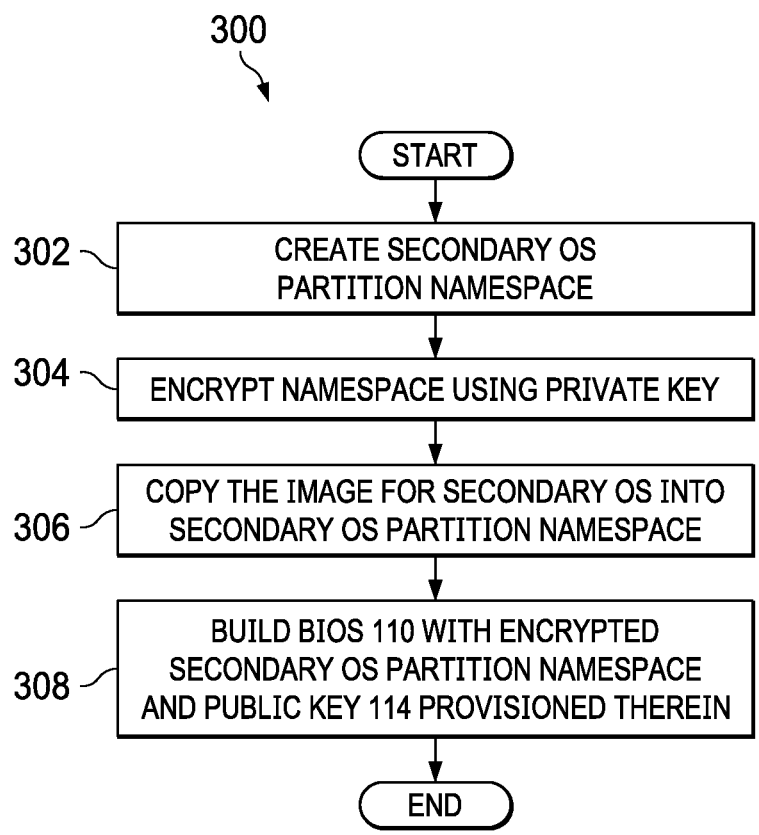
FIG. 3 illustrates a flow chart of an example method for hardening a service operating system partition in connection with information handling system provisioning, in accordance with embodiments of the present disclosure.

FIG. 3 illustrates a flow chart of an example method 300 for hardening a service operating system partition in connection with information handling system provisioning, in accordance with embodiments of the present disclosure. According to one embodiment, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, a provisioning process (e.g., a factory provisioning process) for information handling system 102 may create a secondary OS partition namespace. At step 304, the provisioning process may encrypt the namespace using a private key (e.g., the same private key used in step 204 of method 200). At step 306, the provisioning process may copy the image for the secondary OS into the secondary OS partition namespace. At step 308, the provisioning process may build BIOS 110 such that BIOS 110 includes the encrypted secondary OS partition namespace and public key 114. After conclusion of step 306, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Figure 4:
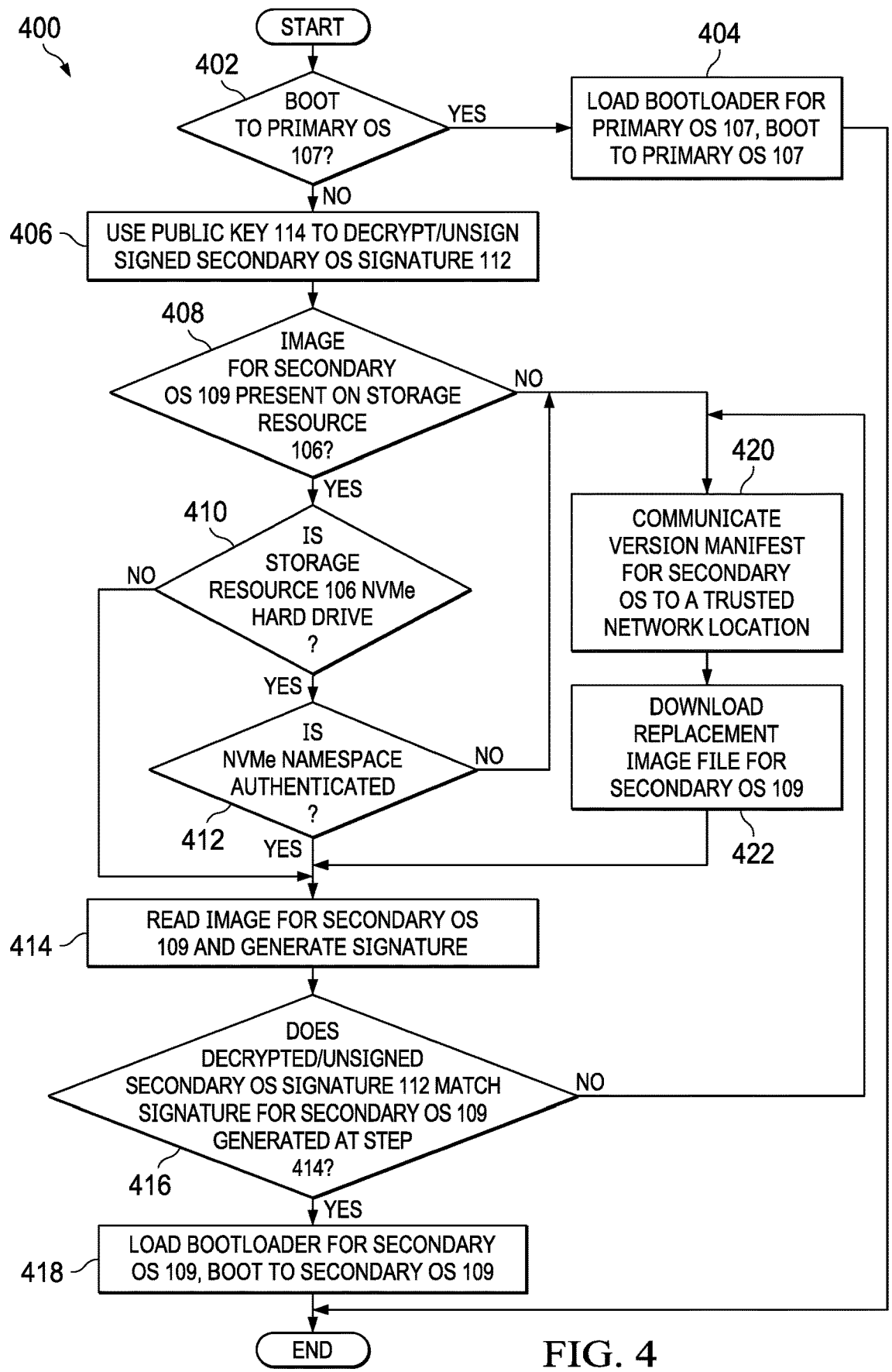
FIG. 4 illustrates a flow chart of an example method for verification of the secondary operating system, in accordance with embodiments of the present disclosure.

FIG. 4 illustrates a flow chart of an example method 400 for verification of secondary operating system 109, in accordance with embodiments of the present disclosure. According to one embodiment, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, BIOS 110 may determine whether to perform a boot to primary OS 107 or secondary OS 109. The determination of whether to perform boot to primary OS 107 or secondary OS 109 is beyond the scope of this disclosure, and such determination may be made based on any suitable number and/or combination of factors, actions, and/or events. If BIOS 110 determines to boot to primary OS 107, method 400 may proceed to step 404. Otherwise, if BIOS 110 determines to boot to secondary OS 109, method 400 may proceed to step 406.

At step 404, BIOS 110 may load a bootloader for primary OS 107 and may proceed to boot to primary OS 107. The integrity and security of primary OS 107 may be ensured by existing secure boot techniques, and is thus outside the scope of this disclosure. After completion of step 404, method 400 may end.

At step 406, BIOS 110 may use public key 114 to decrypt/unsign signed secondary OS signature 112.

At step 408, BIOS 110 may determine if an image for secondary OS 109 is present on storage resource 106. If image for secondary OS 109 is present on storage resource 106, method 400 may proceed to step 410. Otherwise, method 400 may proceed to step 420.

At step 410, BIOS 110 may determine if storage resource 106 is a Non-Volatile Memory Enhanced (NVMe) hard drive. If storage resource 106 is an NVMe hard drive, method 400 may proceed to step 412. Otherwise method 400 may proceed to step 414.

At step 412, BIOS 110 may attempt to authenticate an NVMe namespace of storage resource 106. If BIOS 110 is able to authenticate an NVMe namespace of storage resource 106, method 400 may proceed to step 414. Otherwise, method 400 may proceed to step 420.

At step 414, BIOS 110 may read the image (e.g., Windows image file) of secondary OS 109 (e.g., as stored on storage resource 106 or as downloaded) and generate a signature (e.g., hash) for the image.

At step 416, BIOS 110 may compare the decrypted/unsigned secondary OS signature 112 to the signature for secondary OS 109 generated at step 414. If the signatures match, the image for secondary OS 109 is verified and method 400 may proceed to step 418. If the signatures do not match, the verification of secondary OS 109 has failed and method 400 may proceed to step 420.

At step 418, BIOS 110 may load a bootloader for secondary OS 109 and may proceed to boot to secondary OS 109. After completion of step 418, method 400 may end.

At step 420, BIOS 110 may (e.g., using a preboot network service) communicate (e.g., via the Internet or other network coupled to network interface 108) a version manifest for the secondary OS to a trusted location (e.g., to a server maintained by the provider of information handling system 102 and/or secondary OS 109). At step 422, BIOS 110 may download (e.g., via the Internet or other network coupled to network interface 108) an image file for secondary OS 109 from a trusted location (e.g., from a server maintained by the provider of information handling system 102 and/or secondary OS 109), wherein such image file is based on the version manifest. After completion of step 422, method 400 may proceed again to step 414 to verify the new downloaded image file for secondary OS 109.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
    a processor;
    non-transitory computer readable media communicatively coupled to the processor and having stored thereon a primary operating system of the information handling system and a secondary operating system of the information handling system; and
    a basic input/output system communicatively coupled to the processor and having provisioned thereon:
        a signed signature of the secondary operating system signed with a private key of a public-private key pair; and
        a public key of the public-private key pair;
    wherein the basic input/output system is configured to, responsive to a determination to boot to the secondary operating system in lieu of booting to the primary operating system of the information handling system:
        verify the secondary operating system using the signed signature of the secondary operating system and the public key;
        responsive to verifying the secondary operating system, allow the information handling system to boot to the secondary operating system; and
        responsive to failed verification of the secondary operating system:
            download to the non-transitory computer readable media a replacement image of the secondary operating system;
            verify the secondary operating system using the signed signature of the secondary operating system and the public key; and
            responsive to verifying the replacement image of the secondary operating system, allow the information handling system to boot to the replacement image of the secondary operating system.

2. The information handling system of claim 1, wherein the basic input/output system is configured to verify the secondary operating system by:
    generating a signature of an image of the secondary operating system as stored within the non-transitory computer-readable media;
    decrypting the signed signature of the secondary operating system to generate an unsigned signature; and
    comparing the signature of an image of the secondary operating system as stored within the non-transitory computer-readable media with the unsigned signature.

3. The information handling system of claim 1, wherein the signed signature of the secondary operating system is a hash of an image of the secondary operating system.

4. The information handling system of claim 1, wherein the basic input/output system is further configured to, responsive to the determination to boot to the secondary operating system in lieu of booting to the primary operating system of the information handling system:
    determine if the secondary operating system is stored on a Non-Volatile Memory Enhanced hard drive; and
    if the secondary operating system is stored on a Non-Volatile Memory Enhanced hard drive, authenticate a namespace of a partition of the Non-Volatile Memory Enhanced hard drive having the secondary operating system stored therein.

5. The information handling system of claim 4, the basic input/output system configured to authenticate the namespace based on the public key and an encryption of the partition using the private key.

6. A method, in an information handling system comprising non-transitory computer readable media having stored thereon a primary operating system of the information handling system and a secondary operating system of the information handling system and the information handling system further comprising a basic input/output system communicatively having provisioned thereon a signed signature of the secondary operating system signed with a private key of a public-private key pair and a public key of the public-private key pair, the method comprising:
    responsive to a determination by the basic input/output system to boot to the secondary operating system in lieu of booting to the primary operating system of the information handling system:
        verifying, with the basic input/output system, the secondary operating system using the signed signature of the secondary operating system and the public key;
        responsive to verifying the secondary operating system, allowing, by the basic input/output system, the information handling system to boot to the secondary operating system; and
        responsive to failed verification of the secondary operating system:
            downloading, by the basic input/output system, to the non-transitory computer readable media a replacement image of the secondary operating system;

verifying, by the basic input/output system, the secondary operating system using the signed signature of the secondary operating system and the public key; and responsive to verifying the replacement image of the secondary operating system, allowing, by the basic input/output system, the information handling system to boot to the replacement image of the secondary operating system.

7. The method of claim 6, further comprising verifying the secondary operating system by:

generating a signature of an image of the secondary operating system as stored within the non-transitory computer-readable media;

decrypting the signed signature of the secondary operating system to generate an unsigned signature; and comparing the signature of an image of the secondary operating system as stored within the non-transitory computer-readable media with the unsigned signature.

8. The method of claim 6, wherein the signed signature of the secondary operating system is a hash of an image of the secondary operating system.

9. The method of claim 6, further comprising, responsive to the determination to boot to the secondary operating system in lieu of booting to the primary operating system of the information handling system:

determining if the secondary operating system is stored on a Non-Volatile Memory Enhanced hard drive; and if the secondary operating system is stored on a Non-Volatile Memory Enhanced hard drive, authenticating a namespace of a partition of the Non-Volatile Memory Enhanced hard drive having the secondary operating system stored therein.

10. The method of claim 9, further comprising authenticating the namespace based on the public key and an encryption of the partition using the private key.

11. An article of manufacture comprising:

a computer readable medium; and computer-executable instructions carried on the computer readable medium, the instructions readable by a processor, the instructions, when read and executed, for causing the processor to, in an information handling system comprising non-transitory computer readable media having stored thereon a primary operating system of the information handling system and a secondary operating system of the information handling system and the information handling system further comprising a basic input/output system communicatively having provisioned thereon a signed signature of the secondary operating system signed with a private key of a public-private key pair and a public key of the public-private key pair:

responsive to a determination by the basic input/output system to boot to the secondary operating system in lieu of booting to the primary operating system of the information handling system:

verify, with the basic input/output system, the secondary operating system using the signed signature of the secondary operating system and the public key;

responsive to verifying the secondary operating system, allow, by the basic input/output system, the information handling system to boot to the secondary operating system; and responsive to failed verification of the secondary operating system:

download, by the basic input/output system, to the non-transitory computer readable media a replacement image of the secondary operating system;

verify, by the basic input/output system, the secondary operating system using the signed signature of the secondary operating system and the public key; and responsive to verifying the replacement image of the secondary operating system, allow, by the basic input/output system, the information handling system to boot to the replacement image of the secondary operating system.

12. The article of claim 11, the instructions for further causing the processor to verify the secondary operating system by:

generating a signature of an image of the secondary operating system as stored within the non-transitory computer-readable media;

decrypting the signed signature of the secondary operating system to generate an unsigned signature; and comparing the signature of an image of the secondary operating system as stored within the non-transitory computer-readable media with the unsigned signature.

13. The article of claim 11, wherein the signed signature of the secondary operating system is a hash of an image of the secondary operating system.

14. The article of claim 11, the instructions for further causing the processor to, responsive to the determination to boot to the secondary operating system in lieu of booting to the primary operating system of the information handling system:

determining if the secondary operating system is stored on a Non-Volatile Memory Enhanced hard drive; and if the secondary operating system is stored on a Non-Volatile Memory Enhanced hard drive, authenticating a namespace of a partition of the Non-Volatile Memory Enhanced hard drive having the secondary operating system stored therein.

15. The article of claim 14, the instructions for further causing the processor to authenticate the namespace based on the public key and an encryption of the partition using the private key.

16. An information handling system comprising:

a processor;

non-transitory computer readable media communicatively coupled to the processor and having stored thereon a primary operating system of the information handling system and a secondary operating system of the information handling system; and a basic input/output system communicatively coupled to the processor and having provisioned thereon:

a signed signature of the secondary operating system signed with a private key of a public-private key pair; and a public key of the public-private key pair;

wherein the basic input/output system is configured to, responsive to a determination to boot to the secondary operating system in lieu of booting to the primary operating system of the information handling system:

verify the secondary operating system using the signed signature of the secondary operating system and the public key by:

generating a signature of an image of the secondary operating system as stored within the non-transitory computer-readable media;

decrypting the signed signature of the secondary operating system to generate an unsigned signature; and comparing the signature of an image of the secondary operating system as stored within the non-transitory computer-readable media with the unsigned signature; and responsive to verifying the secondary operating system, allow the information handling system to boot to the secondary operating system.

17. The information handling system of claim 16, wherein the signed signature of the secondary operating system is a hash of an image of the secondary operating system.

18. The information handling system of claim 16, wherein the basic input/output system is further configured to, responsive to the determination to boot to the secondary operating system in lieu of booting to the primary operating system of the information handling system:

determine if the secondary operating system is stored on a Non-Volatile Memory Enhanced hard drive; and if the secondary operating system is stored on a Non-Volatile Memory Enhanced hard drive, authenticate a namespace of a partition of the Non-Volatile Memory Enhanced hard drive having the secondary operating system stored therein.

19. The information handling system of claim 18, the basic input/output system configured to authenticate the namespace based on the public key and an encryption of the partition using the private key.

20. A method, in an information handling system comprising non-transitory computer readable media having stored thereon a primary operating system of the information handling system and a secondary operating system of the information handling system and the information handling system further comprising a basic input/output system communicatively having provisioned thereon a signed signature of the secondary operating system signed with a private key of a public-private key pair and a public key of the public-private key pair, the method comprising:

responsive to a determination by the basic input/output system to boot to the secondary operating system in lieu of booting to the primary operating system of the information handling system:

verifying, with the basic input/output system, the secondary operating system using the signed signature of the secondary operating system and the public key by:

generating a signature of an image of the secondary operating system as stored within the non-transitory computer-readable media;

decrypting the signed signature of the secondary operating system to generate an unsigned signature; and comparing the signature of an image of the secondary operating system as stored within the non-transitory computer-readable media with the unsigned signature; and responsive to verifying the secondary operating system, allowing, by the basic input/output system, the information handling system to boot to the secondary operating system.

21. The method of claim 20, wherein the signed signature of the secondary operating system is a hash of an image of the secondary operating system.

22. The method of claim 20, further comprising, responsive to the determination to boot to the secondary operating system in lieu of booting to the primary operating system of the information handling system:

determining if the secondary operating system is stored on a Non-Volatile Memory Enhanced hard drive; and if the secondary operating system is stored on a Non-Volatile Memory Enhanced hard drive, authenticating a namespace of a partition of the Non-Volatile Memory Enhanced hard drive having the secondary operating system stored therein.

23. The method of claim 22, further comprising authenticating the namespace based on the public key and an encryption of the partition using the private key.

24. An article of manufacture comprising:

a computer readable medium; and computer-executable instructions carried on the computer readable medium, the instructions readable by a processor, the instructions, when read and executed, for causing the processor to, in an information handling system comprising non-transitory computer readable media having stored thereon a primary operating system of the information handling system and a secondary operating system of the information handling system and the information handling system further comprising a basic input/output system communicatively having provisioned thereon a signed signature of the secondary operating system signed with a private key of a public-private key pair and a public key of the public-private key pair:

responsive to a determination by the basic input/output system to boot to the secondary operating system in lieu of booting to the primary operating system of the information handling system:

verify, with the basic input/output system, the secondary operating system using the signed signature of the secondary operating system and the public key by:

generating a signature of an image of the secondary operating system as stored within the non-transitory computer-readable media;

decrypting the signed signature of the secondary operating system to generate an unsigned signature; and comparing the signature of an image of the secondary operating system as stored within the non-transitory computer-readable media with the unsigned signature; and responsive to verifying the secondary operating system, allow, by the basic input/output system, the information handling system to boot to the secondary operating system.

25. The article of claim 24, wherein the signed signature of the secondary operating system is a hash of an image of the secondary operating system.

26. The article of claim 24, the instructions for further causing the processor to, responsive to the determination to boot to the secondary operating system in lieu of booting to the primary operating system of the information handling system:

determining if the secondary operating system is stored on a Non-Volatile Memory Enhanced hard drive; and if the secondary operating system is stored on a Non-Volatile Memory Enhanced hard drive, authenticating a namespace of a partition of the Non-Volatile Memory Enhanced hard drive having the secondary operating system stored therein.

27. The article of claim 26, the instructions for further causing the processor to authenticate the namespace based on the public key and an encryption of the partition using the private key.

* * * * *